(12) United States Patent
Lin

(10) Patent No.: US 6,335,989 B1
(45) Date of Patent: Jan. 1, 2002

(54) HALFTONE PRINTING USING DONUT FILTERS

(75) Inventor: Qian Lin, Santa Clara, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/127,927

(22) Filed: Jul. 31, 1998

(51) Int. Cl.[7] .............................................. G06K 15/00
(52) U.S. Cl. ...................................... 382/260; 382/251
(58) Field of Search ................................. 382/260, 265, 382/237, 251–253; 358/1.9, 455–457, 534–535

(56) References Cited

U.S. PATENT DOCUMENTS

| | | | |
|---|---|---|---|
| 5,317,418 A | * 5/1994 | Lin | 358/456 |
| 5,333,211 A | * 7/1994 | Kanda et al. | 382/54 |
| 5,568,572 A | * 10/1996 | Shu | 358/1.9 |
| 5,592,592 A | * 1/1997 | Shu | 358/1.9 |
| 5,832,122 A | * 11/1998 | Shimazaki | 358/456 |
| 5,966,507 A | * 10/1999 | Lin | 358/1.9 |

FOREIGN PATENT DOCUMENTS

EP          0 422 588 A2   *   4/1991

OTHER PUBLICATIONS

Robert W. Floyd, and Louis Steinberg, "An Adaptive Algorithm for Spatial Greyscale", Proceeding of the Society for Information Display, vol 17, pp. 75–77, 1976.

Robert Ulichney, "The Void–and–Cluster Method for Dither Array Generation", IS&T/SPIE Symposium on Electronic Imaging: Science and Technology, San Jose, CA 1993.

John Dalton, "Perception of Binary Texture and the Generation of Stochastic Halftone Screens", ISF&T/SPIE 1995 International Symposium on Electronic Imaging: Science and Technology, San Jose, CA 1995, SPIE vol. 2411, pp. 207–220.

* cited by examiner

*Primary Examiner*—Thomas D. Lee
*Assistant Examiner*—Stephen Brinich

(57) ABSTRACT

A method of generating a halftone image from a gray scale image using stochastic halftoning printing screens. A clustered dot stochastic screen is prepared for multiple gray levels by using a first filter at the lightest gray levels, switching to a donut filter at gray levels after a selected transition level, optionally using the donut filter at all gray levels. The donut filter has its maxima away from the current pixel.

20 Claims, 12 Drawing Sheets

HALFTONE PRINTING USING DONUT FILTERS

BACKGROUND OF THE INVENTION

1. Field of the Invention

The present invention relates generally to halftone images, and more particularly to methods of generating screens for printing halftone images on printing engines.

2. Art Background

A printer can be designed to print a picture as a halftone or gray scale image. For a halftone image, each pixel of the image either has a dot printed or not printed. For a gray scale image, each dot on a pixel is refined to have one of many gray levels. Halftoning creates the illusion of continuous tone images by judicious arrangement of binary picture elements, simulating the continuous tone image.

A halftone image is usually easier and cheaper to generate than a gray scale image. Many relatively low cost printers are specifically designed to print halftone images. For a printer to print a gray scale image, the image must first be transformed to a halftone image using a screen or set of screens. One objective of the printing industry is to develop appropriate transformation techniques so that the halftone image becomes virtually indistinguishable from the gray scale image.

One prior art method transforms a gray scale image to a halftone image by means of a dither matrix. The gray scale image has many gray levels and many pixels. Each pixel has a value. The dither matrix occupies a physical space and has numerous elements, each with a value. The dither matrix is mapped over the halftone image to generate the halftone image. For a gray scale image that is larger than the dither matrix, the dither matrix is replicated or tiled to cover the entire image. Each pixel in the grayscale image is compared to an element in the dither matrix. If the gray scale image pixel has a larger value, no dot is printed in the corresponding halftone image position. The halftone image created has the same number of gray level patterns as the number of gray levels in the gray scale image. A darker area in the gray scale image is represented in the halftone image by a gray patterns with more dots.

In order to generate a halftone image using the above method, the dither matrix must be carefully designed. The elements in the matrix should not be generated by a random number generator, as a fully random pattern would create a halftone image that is noisy, corrupting the content of the image.

One prior art method of designing a dither matrix is known as the void-and-cluster method. A general discussion of this method can be found in "The Void and Cluster Method for Dither Array Generation" by Robert Ulichney, published in IS&T/SPIE *Symposium on Electronic Imaging: Science and Technology*, San Jose, Calif., 1993.

Another method of generating stochastic screens is found in "Perception of binary texture and the generation of halftone stochastic screens" by J. Dalton, published in IS&T/SPIE 1995 *International Symposium on Electronic Imaging: Science and Technology*, San Jose. Calif., 1995.

Another prior art uses an error diffusion method to generate the halftone image. This method analyzes every pixel of the gray scale image one at a time to decide if a dot is to be printed in its halftone image. Errors from each pixel are "diffused" to subsequent neighboring pixels. Such pixel-to-pixel calculation requires intensive computation, taking much more time to generate the halftone image than a method applying dither matrices. Additionally, the error diffusion method is not suitable for vector graphics, because the values of pixels on a halftone image may not be calculated sequentially. A discussion of the error diffusion method can be found in "An Adaptive Algorithm for Spatial Grayscale" by Floyd and Steinberg, Proceeding of the Society for Information Display, Vol. 17, pp. 75–77, 1976.

Another dither matrix approach by the present inventor is described in U.S. Pat. No. 5,317,418, "Halftone Images Using Special Filters" incorporated by reference herein. This approach, stochastic in nature, produce scattered dots resulting in very uniform patterns in the absence of dot-to-dot interactions in the printing engine. In the case of printing engines where dot-to-dot interactions are present, such as in laser printers, these screens produce patterns that are rough and grainy. What is needed is a method of generating stochastic screens suitable for use in printing engines having dot-to-dot interactions, such as laser printers.

SUMMARY OF THE INVENTION

The present invention provides a method of generating a halftone image from a gray scale image using a dither matrix. The value of every pixel in the halftone image is determined by a direct comparison of the value in a pixel in the gray scale image to the value in an element of the matrix. The method is suitable for both raster and vector graphics, and is also suitable for printing engines having dot-to-dot interactions.

Briefly and in general terms, each of the halftone image, the gray scale image, and the dither matrix occupy physical two-dimensional areas. The three areas are substantially equal to each other. In some cases it may be advantageous to use a dither matrix smaller than the halftone and grayscale images; in this case the dither matrix patterns are replicated or tiled to cover the desired area. Both the halftone image and the grayscale image have many pixels, and each pixel has a value. The dither matrix has many elements, each with a value.

The method of the present invention compares the value of each pixel of the gray scale image with the value of an element in the dither matrix. The result of the comparison determines the value of the corresponding halftone image pixel.

The dither matrix is generated by many patterns, each pattern corresponding to one gray level pattern of the halftone image. Each pattern has many elements, each with a value. The value of each element in a given pattern is determined by a special filter.

According to the present invention, a donut filter is used. Donut filters have the characteristic of peaks occurring away from the current pixel, where the filters of the prior art centered the peak on the current pixel. These prior art filters have the effect of expelling dots, producing a dispersed pattern. The donut filters of the present invention, with peaks away from the current pixel cause a clustering of dots.

Stochastic clustered dot screens are generated by first selecting a transition level within the grayscale range of the image. For the lightest gray levels, lighter than the transition level, a first filter is used to design the halftone pattern. The width of the first filter depends on the gray level. Once the transition level has been reached, a donut filter is used to design the halftone pattern. Dots in the halftone pattern at the transition level serve as seeds where clustered dots are grown. By selecting the transition level at the lightest gray level, the donut filter is used for all gray levels. Clustered halftone dot patterns produced by the donut filter are moire free, and have a halftone noise very similar to the grain noise in photographs, this producing a printed image better resembling a real photograph.

BRIEF DESCRIPTION OF THE DRAWINGS

The present invention is described with respect to particular exemplary embodiments thereof and reference is made to the drawings in which.

DETAILED DESCRIPTION

Figure 1:
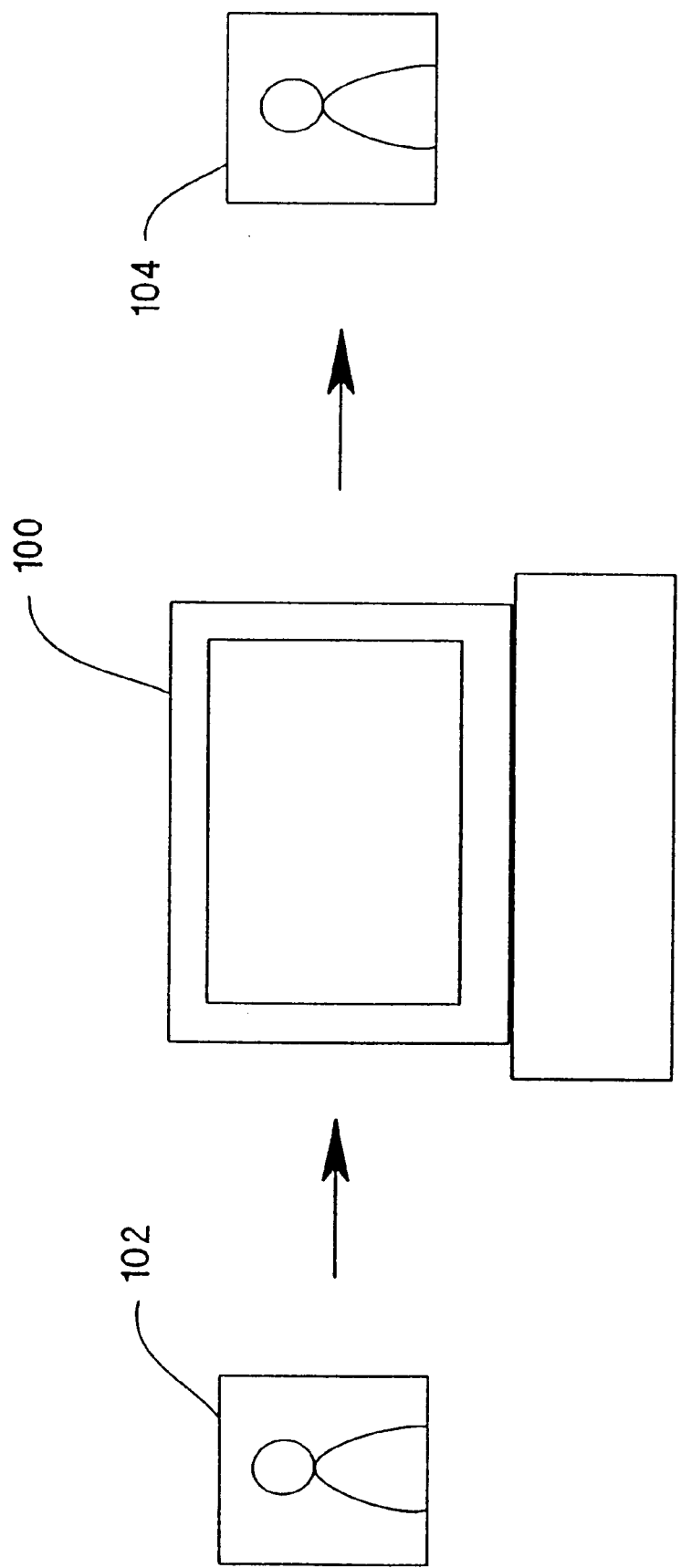
FIG. 1 shows a computer system incorporating the present invention to convert a gray scale image to a halftone image.

FIG. 1 shows a computer system 100 incorporating the present invention to convert a gray scale image 102 to a halftone image 104. As described in U.S. Pat. No. 5,317,418 by the present inventor, this process includes the steps of comparing the value of each pixel of gray scale image 102 with the value of an element of a dither matrix. The result of this comparison determines the value of the corresponding pixel in halftone image 104. The dither matrix is generated by first producing an intermediate pattern based on a special filter. The dither matrix elements with values equal to one and zero are substantially uniformly distributed within the pattern.

Figure 2:
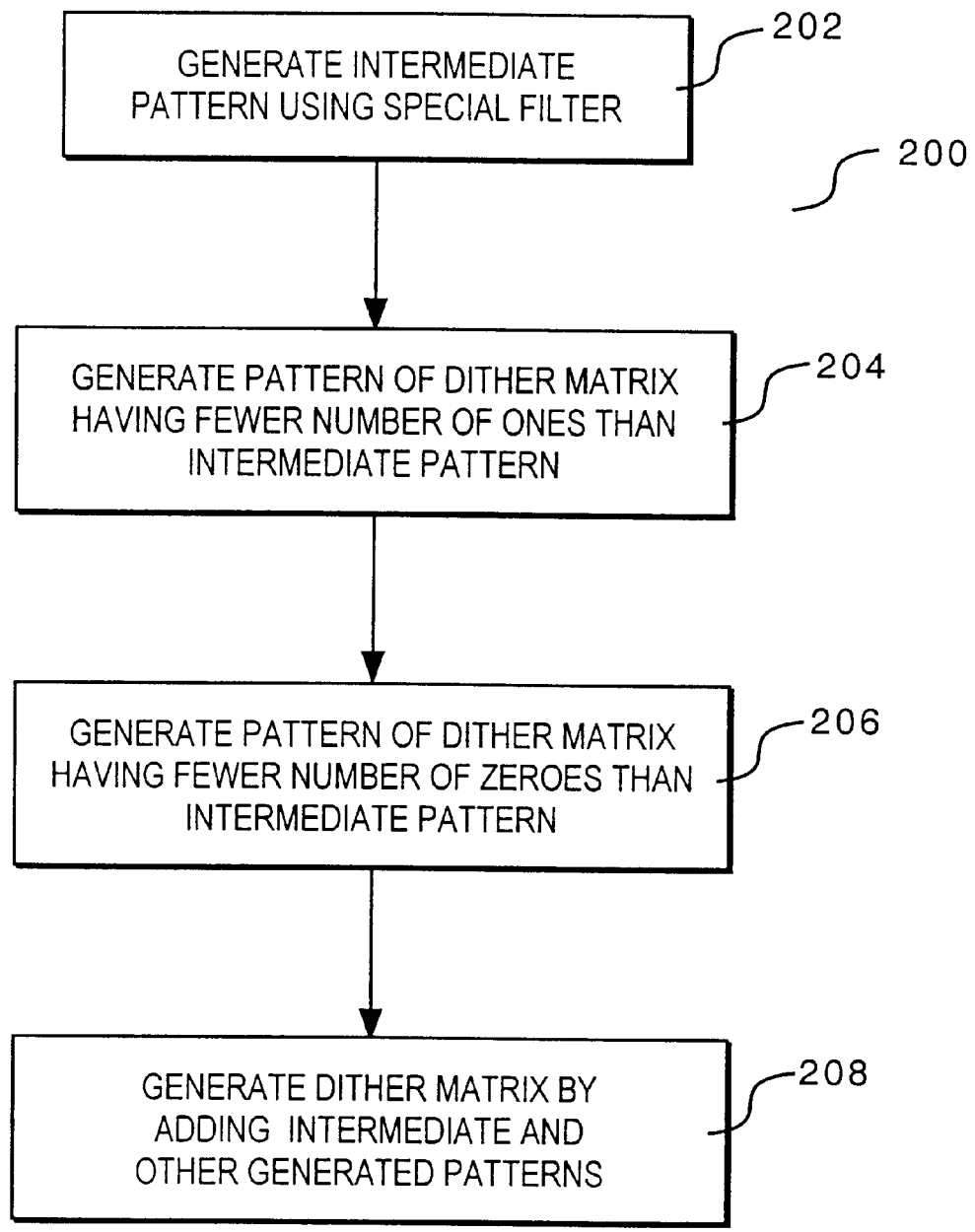
FIG. 2 shows the steps to generate the dither matrix.

One method of forming the dither matrix is shown in FIG. 2. In this approach, a pattern is generated for an intermediate gray level, and then dots are subtracted to form patterns at lighter gray levels, and dots are added to form patterns at darker gray levels. In step 202 an intermediate pattern is generated using the chosen filter, described below. In step 204, patterns of the dither matrix with fewer elements having values equal to one than the intermediate pattern are generated. This is done by replacing a plurality of ones with zeroes from the intermediate pattern. The ones to be replaced are in regions where ones are clustered together, as identified by the chosen filter. The difference in the number of elements having values equal to one, from one pattern to the next pattern, is dependant on a quantization number.

In the third step 206 patterns of the dither matrix with fewer zeroes than the intermediate pattern are generated, This is done by replacing a plurality of zeroes with ones in the intermediate pattern. The zeroes to be replaced are in the regions with zeroes clustered together, as identified by the chosen filter. The difference in the number of elements having values equal to zero, from one pattern to the next, is dependant on the quantization number.

Finally in step 208 the dither matrix is formed by adding all the generated patterns together.

A second approach to generating the dither matrix begins with an intermediate pattern generated for the lightest gray level, and only adds dots for subsequent gray levels. This approach uses steps 202, 206, and 208 of FIG. 2.

Figure 3A:
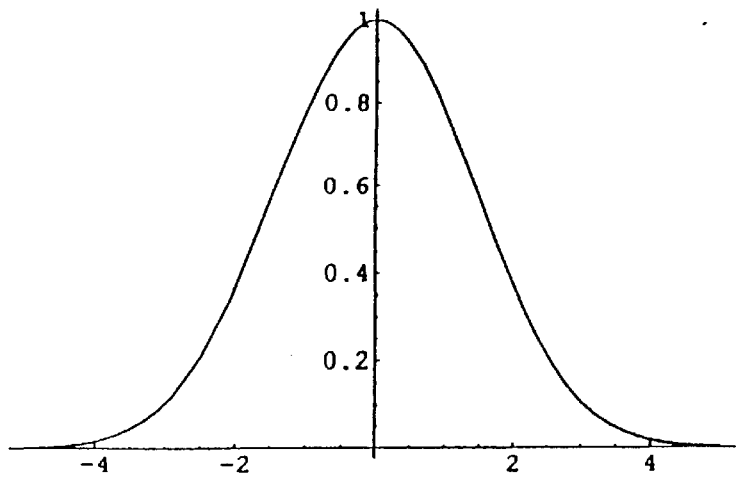
FIGS. 3A–C show a prior art filter and dot dispersion.
Figure 3B:
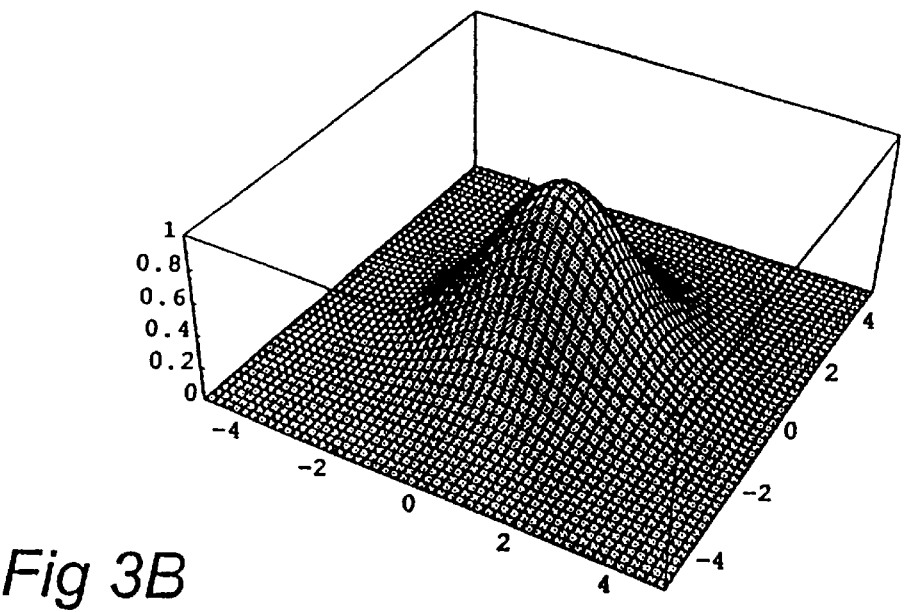
Figure 3C:
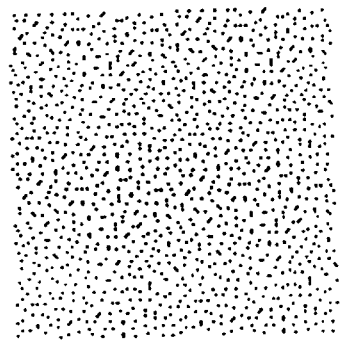

Filters used in the prior art, such as the '418 patent, have their maximal value centered on the current pixel, such as Gaussian, triangular, and rectangular filters. Note that since these filters are commonly used to cover an area around a central pixel, the two dimensional representations shown in the figures are rotated about their centers to form a surface of revolution. As shown in FIG. 3A, these filters all have maxima around the current pixel. The surface of revolution of this filter is shown in FIG. 3B. This results in dot dispersion in the resulting dither matrix, as shown in FIG. 3C.

Figure 4A:
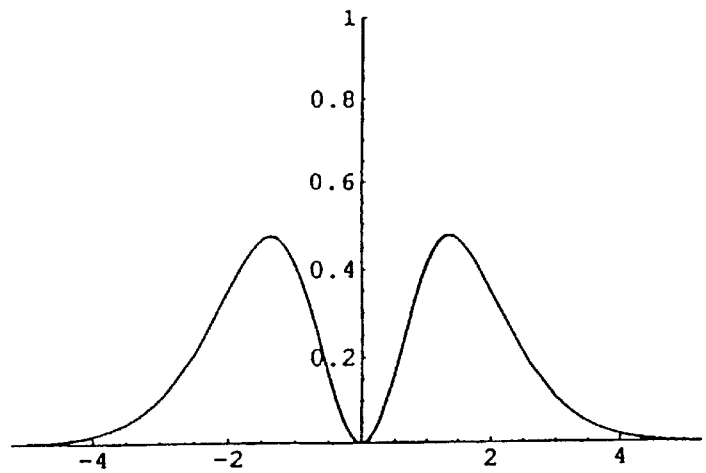
FIGS. 4A–C show a donut filter according to the present invention and dot clustering.
Figure 4B:
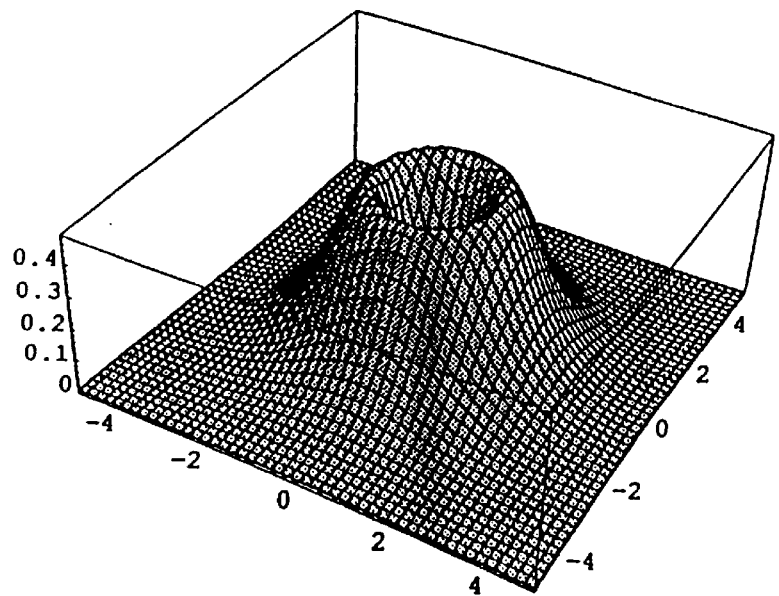
Figure 4C:
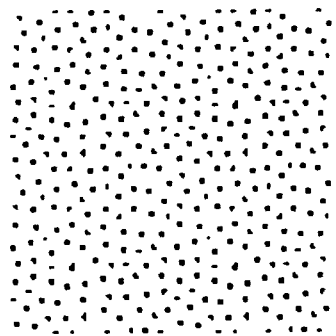

The current invention produces clustered dots through the use of a donut filter as shown in FIG. 4A. As shown in FIG. 4A, the donut filter features local maxima away from the current pixel, and optionally local minima at the local pixel. The surface of revolution for the donut filter is shown in FIG. 4B. The inward inflection around the current pixel provides an energy trap that encourages dots to cluster around the current pixel. As shown in FIG. 4C, this results in dot clustering, producing dot patterns that are more stable.

Figure 5A:
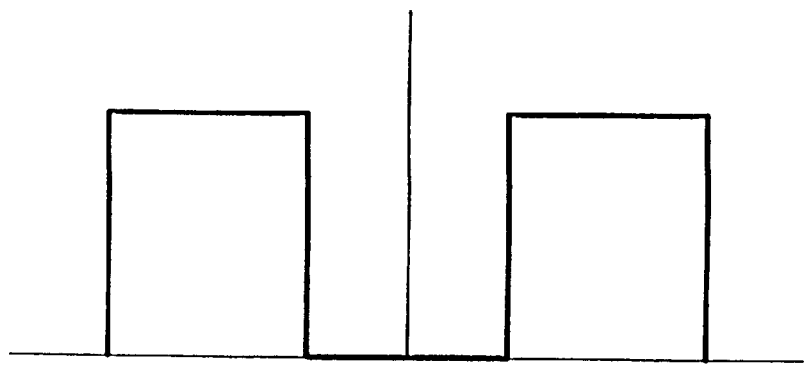
FIGS. 5A–E show a few preferred embodiments of the donut filter.
Figure 5B:
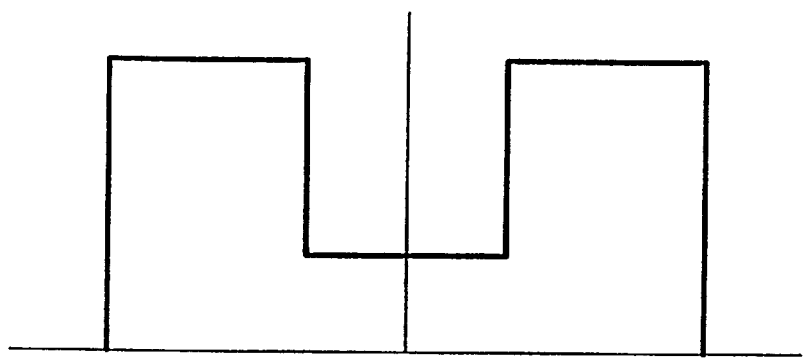
Figure 5C:
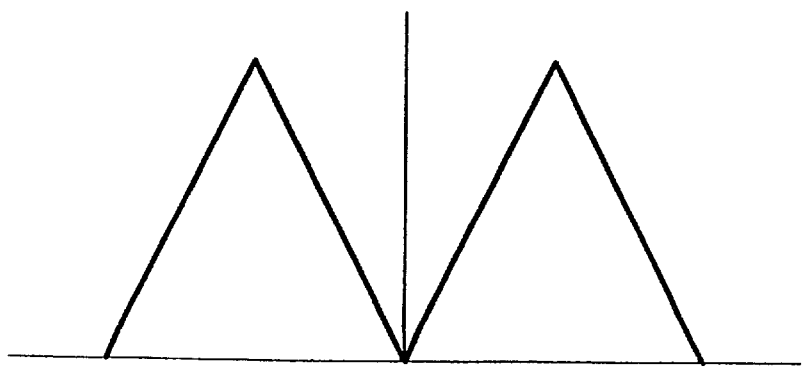
Figure 5D:
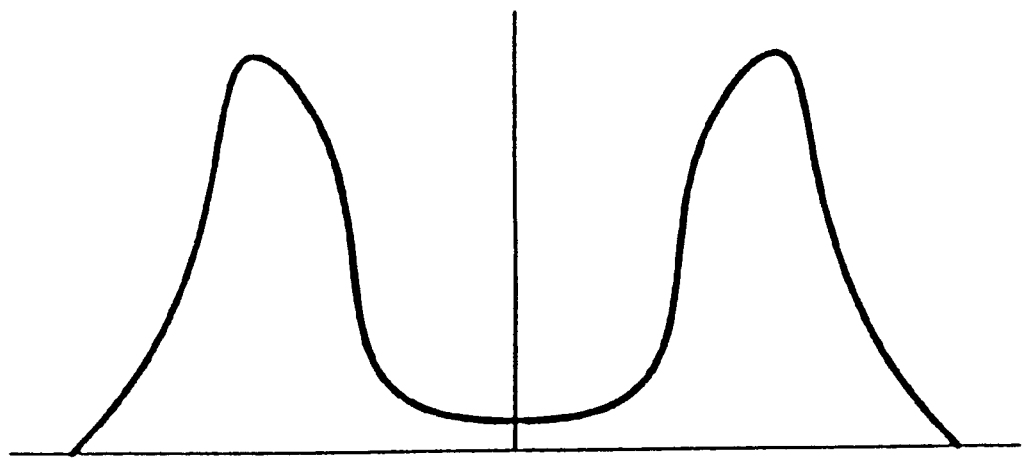
Figure 5E:
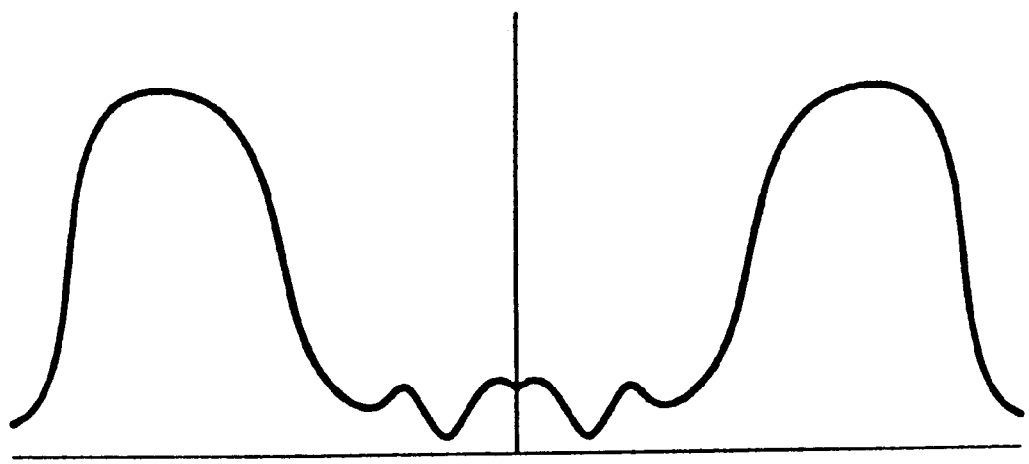
Figure 6:
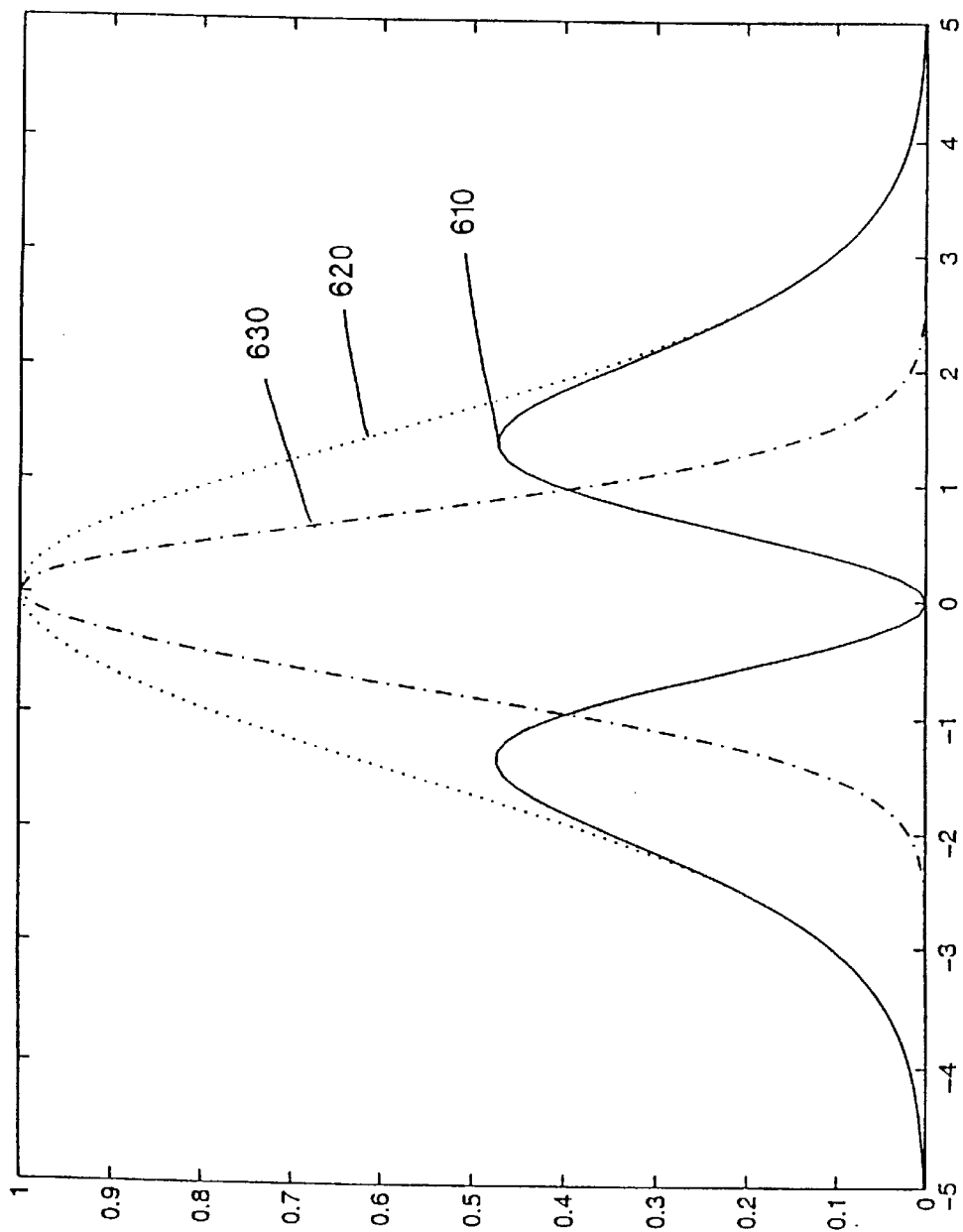
FIG. 6 shows an example donut filter derived from Gaussian distributions.

FIGS. 5A–E show a few preferred embodiments of the donut filter; again these are two dimensional representations. FIGS. 5A and 5B show rectangular donut filters with zero and nonzero values at the current pixel respectively. FIG. 5C shows a triangular donut filter. FIG. 5D shows a smoothed donut filter, with FIG. 5E showing a similar donut filter having ripple away from the maxima. Another preferred embodiment of the donut filter is shown in FIG. 6. Donut filter 610 is the difference of lowpass Gaussian filter 620 and lowpass Gaussian filter 630. Donut filter 610 is selected to better illustrate the present invention.

In the '418 patent a single type of filter (e.g. Gaussian) is used for processing all gray levels in the image. The present invention uses a selectable transition level within the grayscale range to switch between a first filter, for example a lowpass Gaussian filter, and a donut filter. A sample Gaussian lowpass filter is shown in FIG. 3. Example donut filters are shown in FIGS. 4 through 6.

The process of producing the stochastic screen is improved by first selecting a transition level within the grayscale range. Next, starting at the lightest gray level, use lowpass Gaussian filter 620 to design the halftone pattern at this level using the procedure shown in FIG. 2 and described earlier. Note that the width of the Gaussian filter depends on the gray level. Once the transition level is reached, donut filter 610 is used to design the halftone patterns at all subsequent levels by the same process. Different settings of the transition level result in the donut filter being used for none, some, or all of the gray levels. For example if the transition level is set to the lightest gray level, the donut filter will be used for all gray levels.

The particular selection of the transition level is dependant on the printing process. The donut filter may be used for all gray levels, or the transition level may be set by using the lowpass filter until the pattern becomes dense enough that the dots begin to touch, at which point the donut filter should be used, as it produces more stable clusters of dots.

Figure 9:
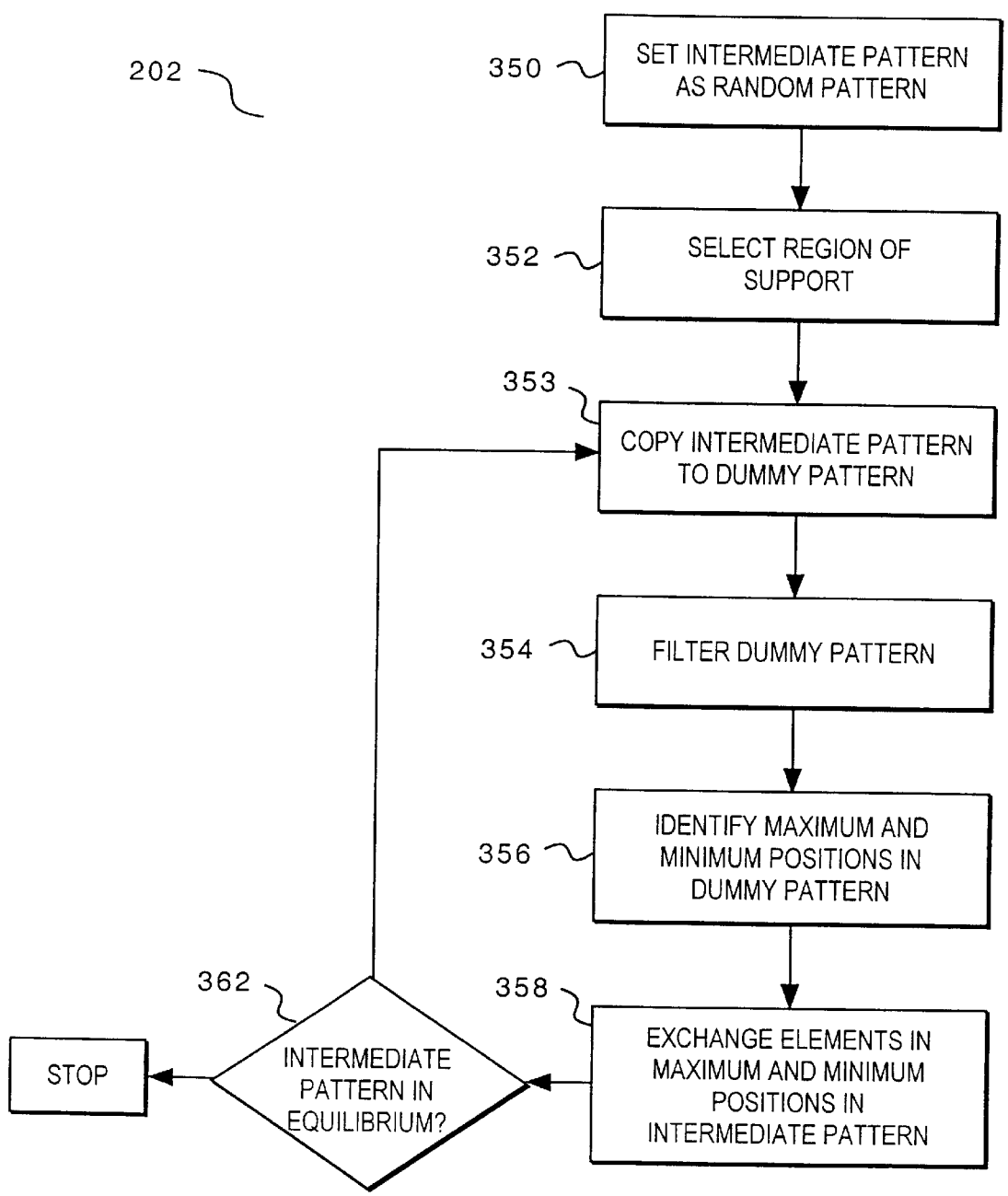

FIG. 9 describes step 202 of generating the intermediate pattern in more detail. Once the intermediate pattern is generated in step 350, a region of support is selected in step 352.

When selecting a region of support for gray levels lighter than the transition level, the same process as disclosed in the '418 patent is used to calculate the parameters for the Gaussian lowpass filter, producing a first Gaussian filter 620 as shown in FIG. 6.

Figure 10:
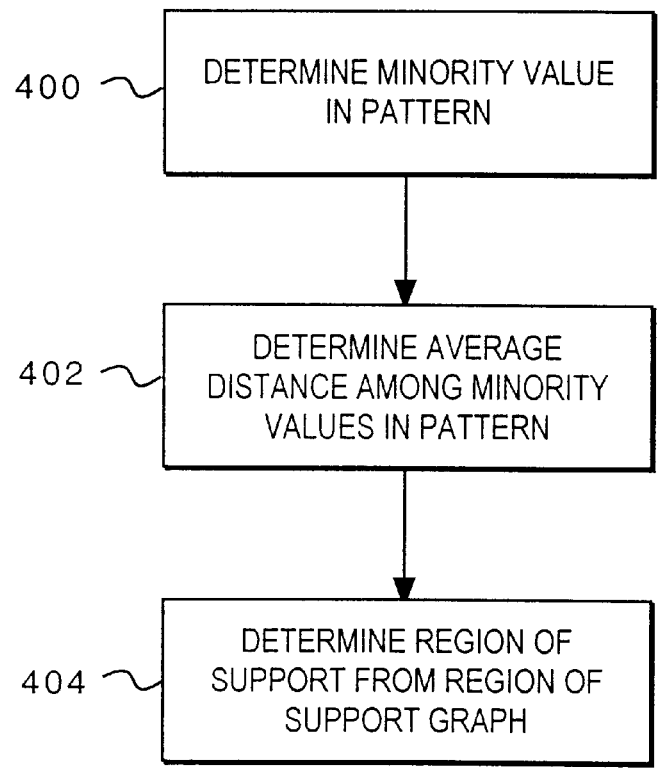
Figure 11:
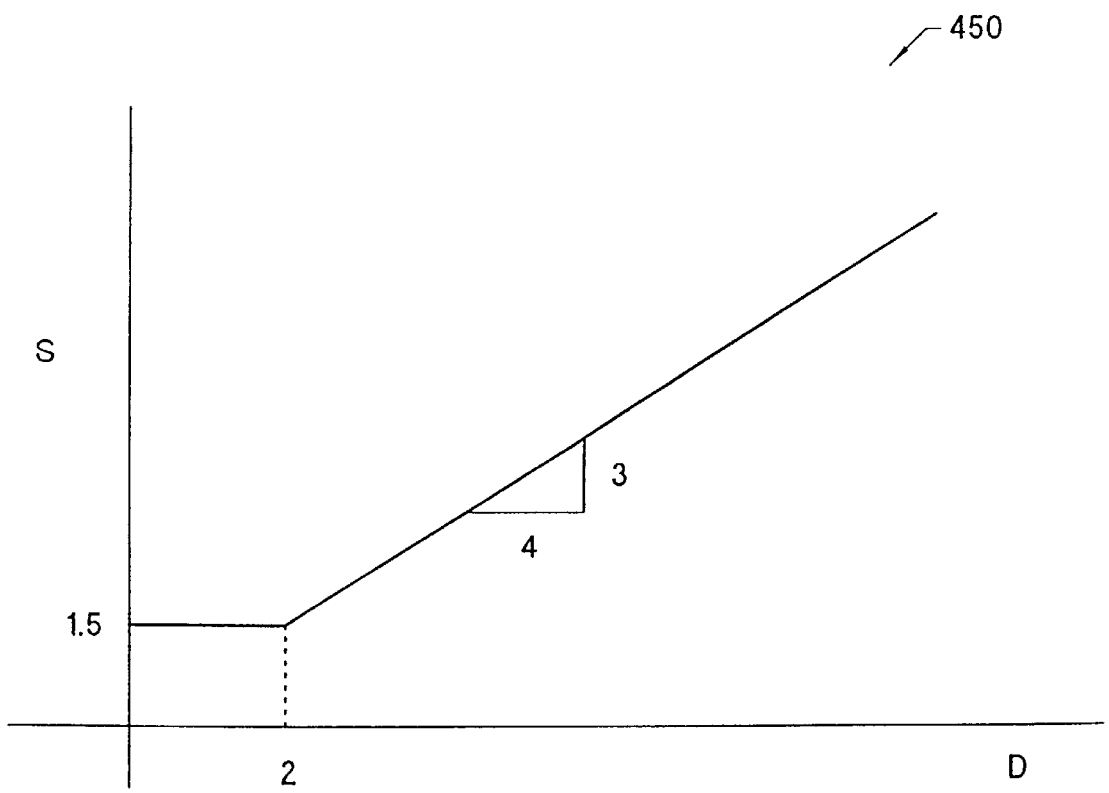
FIG. 11 illustrates a region of support graph of the present invention.

FIG. 10 shows the steps to select a region of support. The first step 400 is finding the minority value in the pattern, identifying whether there are fewer ones or zeroes. After the minority value is identified, the average separation D among the elements with the minority value in the pattern is calculated 402. In one preferred embodiment, this is done by dividing the total number of elements in the pattern by the number of elements with the minority value and taking the square root. The value for D is applied to a region-of-support graph 450 as shown in FIG. 11 to get s, the sigma of Gaussian filter 620. For the instant invention, this is calculated as $$y(d) = e^{(-d^2/2s^2)}$$

The diameter of the region of support is related to the sigma s. In the present example, the diameter is equal to about 3.7 * s. From its diameter, the region of support of the gaussian curve is found, 404. The region of support graph 450 is generated by trial and error, through human visual response. The graph is a substantially nondecreasing function. This is because as the average separation D of the minority value elements increases, the filter has to cover a larger area to perform meaningful filtering. If the filter does not cover a large enough area, the filtered output would be the same as the input. For the filter to cover a larger area, the sigma must increase. Based on this idea, different region of support graphs were applied to the present invention. By trial and error the region of support graph shown in FIG. 11 was found to provide acceptable patterns for the dither matrix.

In the present example, when D is less than 2, the sigma s is constant and equal to 1.5. When D is greater than 2, sigma s is related to D by a straight line with a slope of 0.7. It should be obvious to one skilled in the art that constant values different from 1.5 (such as values ranging from 1 to 2) and slopes different from 0.0 (such as values ranging from 0.5 to 1) can be used in the present invention.

Alternatively, one can obtain the region of support experimentally by using a sequence of filters with varying filter width for a gray level and visually examining the halftone pattern visibility to select a filter. This operation is repeated for a number of gray levels scattered between the minimum and maximum gray levels, typically 0 and 255. Optimal filter parameters are selected at particular gray levels and then the parameters are interpolated for the entire gray level range. The optimal filter parameters also depend on the type of printer and printing engine. This operation may need to be repeated for new printing engines.

Following selection of the region of support, the next step is to copy, 353, the intermediate pattern to a dummy pattern. The dummy pattern is then filtered, 354. Minimum and maximum positions in the dummy pattern are identified, 356. After the maximum and minimum position are identified, the elements in the intermediate pattern are exchanged.

The above steps of copying 353, filtering 354, identifying 356, and exchanging 358 are repeated 362, one or more times until the intermediate pattern reaches an equilibrium state.

Steps 204 and 206 of FIG. 2 generate patterns for the different gray levels of the dither matrix from the intermediate pattern. In step 204, patterns of the dither matrix with fewer elements having values equal to one than the intermediate pattern are generated. This is done by replacing a plurality of ones with zeroes from the intermediate pattern. The ones to be replaced are in regions where the ones are clustered together as identified by the filter selected by the transition level. When selecting a region of support for gray levels above the transition level, using the Gaussian lowpass filter for example, the region of support is calculated as described in the '418 patent or in the experimental procedure described above. When selecting a region of support for gray levels below the transition level, using the donut filter, the same calculations are made, producing first Gaussian filter 620. A second lowpass Gaussian filter 630 is generated using half the width of the first Gaussian filter 620. Donut filter 610 is the difference between first Gaussian lowpass filter 620 and second lowpass Gaussian filter 630.

In step 206, patterns of the dither matrix with more elements having values equal to one than the intermediate pattern are generated. This is done by replacing a plurality of zeroes with ones from the intermediate pattern. The zeroes to be replaced are in regions where the zeroes are clustered together as identified by the filter selected by the transition level. As in step 204 above, when selecting a region of support for gray levels above the transition level, using the Gaussian lowpass filter for example, the region of support is calculated as described in the '418 patent. When selecting a region of support for gray levels below the transition level, using the donut filter, the same calculations are made, producing first Gaussian filter 620. A second lowpass Gaussian filter 630 is generated using a width less than that of the first Gaussian filter 620. While a value of half the width of first Gaussian filter 620 is used in the preferred embodiment, other values may be used. Donut filter 610 is the difference between first Gaussian lowpass filter 620 and second lowpass Gaussian filter 630.

Figure 7:
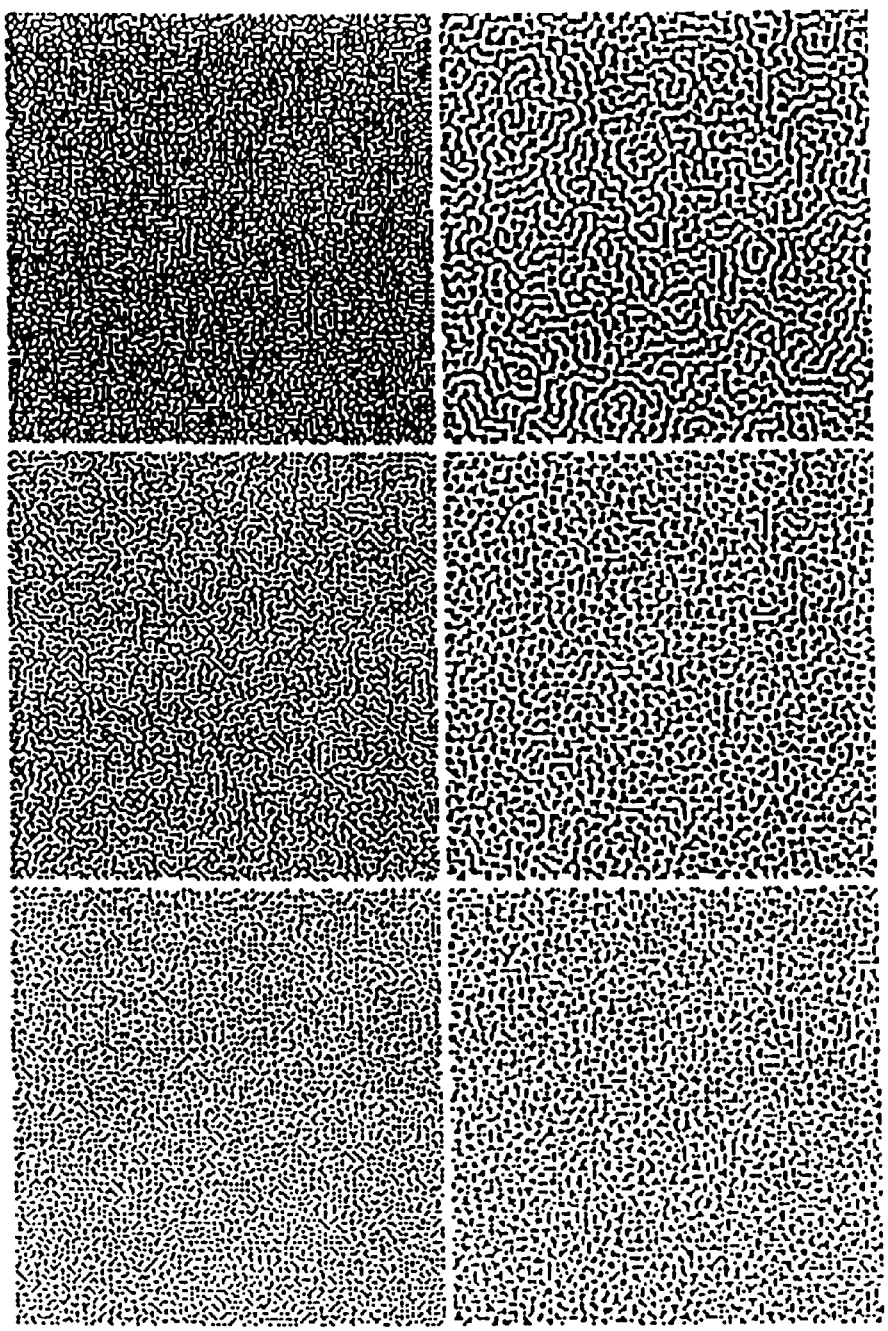
FIG. 7 shows a set of gray patches rendered by stochastic screens using Gaussian and donut filters.

FIG. 7 shows gray patches rendered by stochastic screens using Gaussian filter 630 for all gray levels on the top, and on the bottom patches rendered using Gaussian filter 630 until transition gray level of 48 is reached, at which time donut filter 610 is used for the remaining gray levels. The left column is at gray level 66, the middle column gray level 96, and the right column gray level 126. The halftone patterns are printed at 75 dots per inch to allow a clear view of the dot arrangement, showing the clustering of dots in the bottom images.

Figure 8:
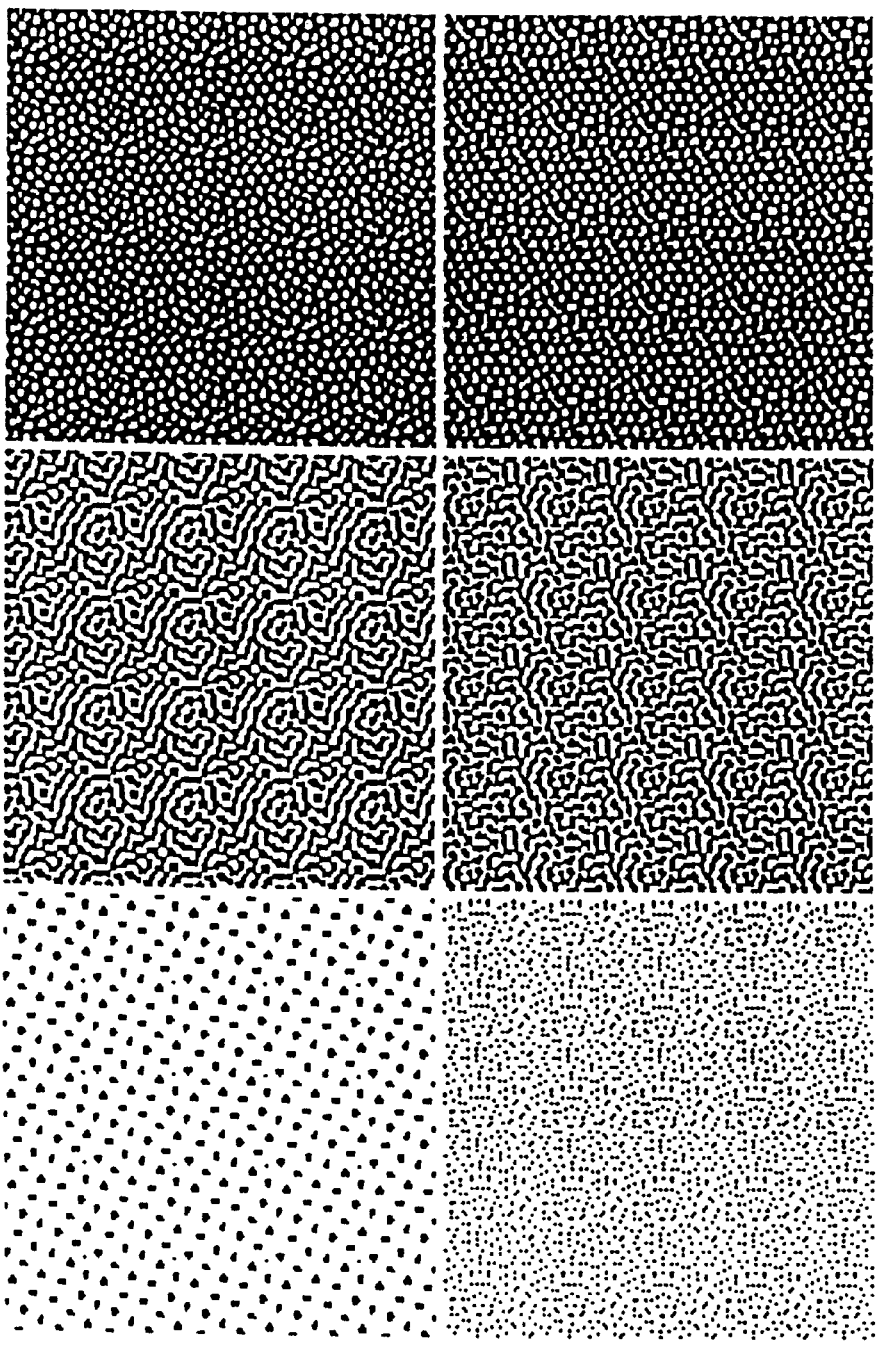
FIG. 8 shows the effect of differing transition levels on donut filters, FIG. 9 describes the steps of generating the intermediate pattern in the present invention, FIG. 10 describes the steps to select a region of support of the filter from the pattern.

FIG. 8 shows the effect of selecting different transition levels. The top row shows halftone patterns generated with a transition level of one, i.e. donut filter 610 was used for all gray levels except for the first gray level. The bottom row shows halftone patterns generated with a transition level of 48. The left column is gray level 32, the middle column gray level 128, and the right column gray level 192. It is clear that the transition value has an important effect on the appearance of halftone patterns in the highlight region. However, in the midtone region, the difference becomes very small, and in the shadow region the difference becomes negligible.

Use of the donut filter in generating stochastic screens has the advantage that the screens are moiré and pattern free, and also are far less likely to show bands. This is important when dealing with printing engines having dot-to-dot interaction, such as laser printers. Another advantage is that the halftone noise is very similar to that of the grain noise in a photograph, producing a printed image that better resembles a real photograph. Additionally, the stochastic screen design method of the present invention generates clustered dot halftone patterns, with the advantage of better tone reproduction characteristics, and more stable dots in printing engines with dot-to-dot interaction.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A method of generating a dither matrix for an N level grayscale image, comprising the steps of:
   a) generating an intermediate halftone pattern corresponding to a transition level;
   b) applying a first filter type to generate halftone patterns lighter than the intermediate halftone pattern;
   c) applying a second filter type to generate halftone patterns darker than the intermediate halftone pattern, wherein a maximum of one of the first and second filter types is located approximately at a filter center, wherein a maximum of the other of the first and second filter types is located away from the filter center; and
   d) combining each of the generated patterns and the intermediate pattern to form the dither matrix.

2. The method of claim 1 wherein the first filter type is Gaussian with a local maxima at its center.

3. The method of claim 2 wherein the Gaussian first filter has a profile $y(d)=e^{(-d^2/2s^2)}$, wherein d is a distance to a center of the first filter, wherein s is function of an average separation, D, between minority elements of the threshold pattern.

4. The method of claim 3 wherein $$D = \sqrt{\frac{\text{number of elements in threshold pattern}}{\text{number of minority elements in threshold pattern}}}.$$

5. The method of claim 4 wherein s is a piecewise linear function of D.

6. The method of claim 1 wherein the second filter type has a local maxima at a location other than its center.

7. The method of claim 6 wherein the second filter type has a local minima at its center.

8. The method of claim 6 wherein the second filter type is a donut filter.

9. The method of claim 8 wherein the second filter type is a rectangular donut filter.

10. The method of claim 8 wherein the second filter type is a triangular donut filter.

11. The method of claim 8 wherein the second filter type corresponds to a difference between two Gaussian filters.

12. The method of claim 1 wherein the transition level is located approximately halfway between levels 0 and N.

13. The method of claim 1 wherein the transition level is located at a level corresponding to the lightest halftone pattern.

14. The method of claim 1 wherein step d) further comprises the step of summing the intermediate pattern and all the generated patterns to form the dither matrix.

15. A method of generating a dither matrix for an N level grayscale image, comprising the steps of:
   a) generating an intermediate halftone pattern corresponding to a transition level;
   b) applying a donut filter to generate halftone patterns darker than the intermediate pattern, wherein each darker halftone pattern is generated by applying the donut filter to a nearest lighter halftone pattern; and
   c) combining each of the generated patterns and the intermediate pattern to form the dither matrix.

16. The method of claim 15 wherein the donut filter is a selected one of a rectangular and a triangular donut filter.

17. The method of claim 15 wherein the donut filter represents a difference between two Gaussian filters.

18. The method of claim 15 wherein the transition level is located approximately halfway between levels 0 and N.

19. The method of claim 15 wherein the transition level is located at a level corresponding to the lightest halftone pattern.

20. The method of claim 15 wherein the donut filter has a local minima at its center.

* * * * *